United States Patent [19]

Zeiter et al.

[11] Patent Number: 5,664,454
[45] Date of Patent: Sep. 9, 1997

[54] DEVICE FOR MANUFACTURING SHAPED FORMS OF PACKAGING

[75] Inventors: Patrik Zeiter, Bülach; Heinz Oster, Feuerthalen; Monique Roulin, Schaffhausen, all of Switzerland

[73] Assignee: Alusuisse Technology & Management Ltd., Switzerland

[21] Appl. No.: 602,088

[22] Filed: Feb. 15, 1996

[30] Foreign Application Priority Data

Mar. 21, 1995 [CH] Switzerland .................. 00798/95

[51] Int. Cl.$^6$ .......................... B21D 22/00; B21D 22/21
[52] U.S. Cl. .......................... 72/348; 72/379.2; 72/350
[58] Field of Search .......................... 72/348, 350, 351, 72/370.2, 296, 297, 264

[56] References Cited

U.S. PATENT DOCUMENTS

| | | | |
|---|---|---|---|
| 2,873,709 | 2/1959 | Celovsky | 72/361 |
| 3,685,338 | 8/1972 | Hoffman | 72/348 |
| 4,195,510 | 4/1980 | Juergens | 72/350 |
| 4,532,793 | 8/1985 | Bezold | 72/350 |
| 4,563,325 | 1/1986 | Coffman | 264/550 |

FOREIGN PATENT DOCUMENTS

| | | |
|---|---|---|
| 2321980 | 11/1974 | Germany. |
| 0563934 | 10/1993 | Germany. |

Primary Examiner—Lowell A. Larson
Assistant Examiner—Rodney A. Butler
Attorney, Agent, or Firm—Bachman & LaPointe, P.C.

[57] ABSTRACT

Device for manufacturing cold-formed shaped forms of packaging out of a metal-plastic laminate where the said device contains a die with at least one die opening, in the die opening a stamp which may be driven by the die, and a retaining tool as a clamping facility that holds the laminate securely between the die and the clamping facility. The die and the retaining tool feature a facing edge region and the die, within the edge region, a shoulder region that surrounds the die opening, and the surface of the shoulder region lies 0.01 to 10 mm lower than the surface of the edge region of the die. Parts or in particular the whole of the shoulder region may be covered with a surface layer of low friction characteristics. The metal-plastic laminate is held clamped between the edge of the die and the edge of the retaining tool, and the stamp draws and stretches the part of the laminate in the region of the shoulder over the shoulder into the die opening.

20 Claims, 2 Drawing Sheets

DEVICE FOR MANUFACTURING SHAPED FORMS OF PACKAGING

BACKGROUND OF THE INVENTION

The present invention relates to a deuce for manufacturing cold-formed shaped ferns of packaging out of a metal-plastic laminate where the said device contains a die with at least one die opening, in the die opening a stamp which may be driven by the die, and a retaining tool as a clamping facility that holds the laminate securely between the die and the clamping facility. Further, the present invention also relates to a process for manufacturing cold-formed shaped forms of packaging using the device according to the invention.

It is known to manufacture shaped forms of packaging such as e.g. base parts for blister packs, also known as push-through packs, or other packaging containers e.g. by deep drawing, stretch-drawing or thermoforming. The shaped forms of packaging may be manufactured out of thermoplastics or out of composite or laminates such as e.g. aluminum foils with plastic films or extruded layers of thermoplastics.

If the packaging is made of laminates containing metal foils, then this may be performed using shaping tools comprising a stamp, a die and a retaining tool. During deformation the laminate is clamped securely in place between the die and the retaining tool, and the stamp moved towards the laminate. As it is lowered, the stamp penetrates deeper into the openings in the die thereby deforming the laminate. In the process the laminate is converted into a shaped part with one or a plurality of recesses. The recesses are surrounded by shoulders and the shoulders correspond to the laminate in the original fiat plane. Only that part of the laminate in the region of the die opening can flow or be stretched to form a shaped part. In order that the laminate, in particular the laminate containing metal foil, can be deformed without creating cracks and pores, an adequate lateral distance must be maintained between the stamp and the die opening. Cold forming a laminate containing a metal foil using this process results in a recess sidewall of only small height. This leads to poor drawing ratios, i.e. shallow recesses of large diameter, and therefore to packaging forms which are too large in relation to the contents.

One possibility to have more laminate available for deformation may be to reduce the retaining force and to employ methods of deep drawing technology. This technology may not, however, be employed with laminates containing metal foil e.g. for manufacturing blister packs, as folds would be produced in the edge or shoulder regions. The edge region and if desired the shoulder region of shaped forms of packaging are as a rule employed for sealing on the lid. If there are folds present, the edge and the shoulders of the part could not be sealed.

SUMMARY OF THE INVENTION

The object of the present invention is to describe and realize a device and process which enable laminates containing metal foils to be transformed by cold forming into shaped forms of packaging or shaped parts that are free of folds and larger wall height.

This objective is achieved by way of the invention, in the form of a device characterized that its die and the retaining tool feature a facing edge region and within the edge region of the die a shoulder region that surrounds the die opening, and the surface of the shoulder region lies 0.01 to 10 mm lower than the surface of the edge region of the die.

In a preferred version the surface of the shoulder region of the die lies 0.1 to 2 mm, preferably 0.15 to 0.3 mm lower than the surface of the edge region of the die.

The device according to the present invention may contain a die with a die opening or a plurality of die openings.

BRIEF DESCRIPTION OF THE DRAWINGS

FIG. 1 shows in cross-section a device for manufacturing cold-formed blister packs according to the current state of the art.

FIGS. 2 and 3 show in cross-section two different versions of devices according to the invention.

FIG. 4 shows in plan view a die for the device according to the present invention.

FIG. 5 represents a plan view of a retaining tool for the device according to the invention.

DETAILED DESCRIPTION OF PREFERRED EMBODIMENTS

Figure 1:
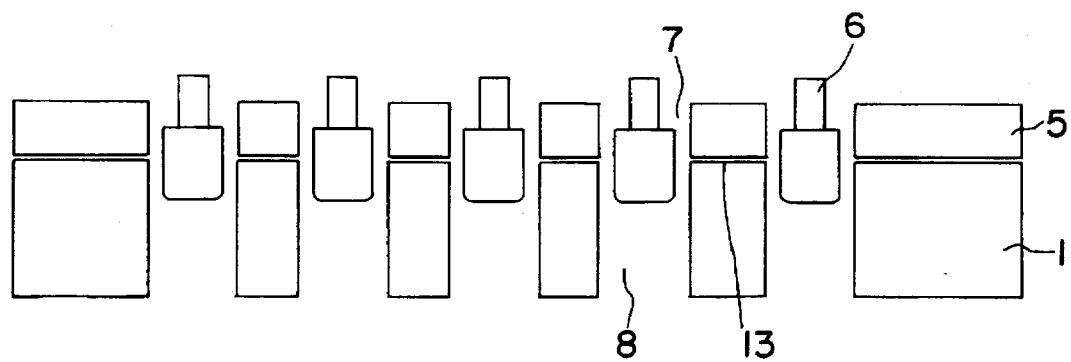
FIGS. 1 to 5 explain the present invention in greater detail by way of example.

The device, and in particular the die, features 1 to 200, preferably 8 to 40 die openings. The deformation of the metal:plastic laminate is performed by a stamp, which may as such push into the die opening. If the die exhibits a plurality of openings, the stamp may feature a stamp holder or holder plate or the like with a number of stamping tools corresponding to the number of die openings. The stamps or stamping tools are dimensioned in such a way that they can push into the die opening while deforming the metal-plastic laminate. It is advantageous for the diameter of the stamp or stamping tool to be 3 to 35%, preferably 1 to 15% and in particular 5 to 10% smaller than the diameter of the die opening in question. By the diameter in the ease of die openings that are not round, such as one with a convex cross-section, e.g. elliptical, oval, polygonal, rectangular, trapezium-shaped, rhomboid in shape etc., is to be understood the smallest diameter.

The walls of the die opening are as a rule at an angle of 90° to the surface of the shoulder region. The edge formed by the wall of the die opening and the surface of the shoulder region maybe rounded with a radius of e.g. 0.1 to 10 mm, usefully from 0.1 to 1.0 mm.

In another preferred version the edge regions of the retaining tool and the die are each 1 to 100 mm broad, usefully 2 to 30 mm, and preferably 3 to 20 mm broad.

The die has an edge region and within this edge region a shoulder region. The die openings are arranged in particular symmetrically or also asymmetrically within the shoulder region with the shoulder region forming struts that surround the die openings.

The shoulder region of the die features distances of 1 to 50 mm, preferably 5 to 25 mm, between the edge region of the die and the die openings, and between the individual die openings.

The edge region of the retaining tool or the edge region of the die, or the edge regions of the retaining tool and the die, may exhibit a roughness pattern over part or the whole of the surface there. Typical roughness patterns are corrugations, waffle patterns, embossed patterns, honeycomb patterns, knobs, tooth-like patterns, toughened surfaces etc. In the working position the edge regions of the retaining tool and the die are usefully together over the metal-plastic laminate and, if desired with the support of the pattern of roughness, hold the laminate securely in place such that it cannot be stretched. The shoulder region of the die usefully lies a distance from the parts of the retaining tool facing it, and in this region the metal-plastic laminate is not in contact with the retaining tool and the metal-plastic laminate can be stretched or flow according to the degree to which the stamp is lowered.

The shoulder regions of the die may be covered wholly or partly With a layer that at least on the surface exhibits a lower degree of friction. A lower degree of friction in the present case represents values of 0.3 or less to 2.2 (dimensionless number), as measured according to British Standard BS 2782 method 311 A. The low friction layer may e.g. contain or be of plastics such as polytetrafluorethylene, polyoxymethylene (polyacetal POM), polyethylene or polyethylene-terephthalate. The low friction layer may also exhibit in mixture form two or more of the plastics mentioned by way of example and additionally in divided form hard substances such as glasses in spherical form. Instead of the plastics other materials may be considered for the low friction layer. This means, for example, metals such as aluminum or chromium steel, especially also with polished surfaces. Other low friction layers such as ceramic layers or layers containing graphite, boron nitride or molybdenum disulphide may be employed. The thickness of the low fiction layer on the shoulder region of the die is not critical as only the surface is of consequence. Under industrial conditions the layer is subjected to large demands with regard to frictional forces and so a thickness that permits some degree of material loss or wear should be preferred. For that reason the thickness of layer of the above mentioned plastics may be e.g. from 0.5 to 20 mm. The layer of plastic may be inserted in the lowered region of the die as a preform, or it may be deposited by spraying, brushing or wiping, or some other method of deposition. The plastics may be contained in a matrix of some other material such as ceramic or metal. Metal layers may be deposited for example on the matrix using chemical or physical methods such as electroplating or electrolytic deposition, plating or vapour deposition in vacuum, or the die may be at least in part made of the metals in question.

As a rule the stamp exhibits the same number of stamping tools as the number of die openings, and these stamping tools penetrate the appointed openings in the retaining pad and die openings. Usefully at least the surface effecting deformation, i.e. the surface of the stamp or stamping tools coming into contact with the laminate, is of e.g. plastics such as polytetrafluorethylene, polyoxymethylene (polyacetal POM), polyethylene or polyethyleneterephthalate, or two or more of the exemplified plastics mentioned above in mixture form, or one or more of the plastics in mixture form containing additionally in divided form hard materials such as glasses in spherical form. Instead of the above mentioned plastics other materials may be considered such as e.g. metals such as aluminum, or chromium steel, especially with polished surfaces. Further surface layers are ceramic layers or layers containing graphite, boron nitride or molybdenum disulphide. The stamps or stamping tools may be covered with the materials or the stamps or stamping tools may, at least in the region making contact with the laminate, be made partially or wholly of these materials.

Metal-plastic laminates that may be employed may e.g. be laminates containing an 8 to 150 μm, preferably 20 to 80 μm thick metal foil. The foil may e.g. be of steel, iron, copper and preferably aluminum. Included thereby are also metal foils out of alloys containing for the main part one of the above mentioned metals. Preferred foils of aluminum may e.g. be of aluminum having a purity of 98.3%, usefully 98.5% and in particular 99.8%, the rest making up the 100% being the usual impurities. Further, for aluminum foils for example of the AlFeSi type may be employed.

Plastics that may be employed may be e.g. layers, films or film-laminates, whereby the films and film-laminates may be uni-axially or biaxially stretched, and of thermoplastics classified as polyolefins, polyamides, polyesters, polyvinyl chlorides and others.

Typical examples of thermoplastics from the polyolefin range are polyethylenes such as MDPE, HDPE, uni and biaxially stretched polyethylenes, polypropylenes such as east polypropylene and uni or biaxially stretched polypropylenes or, from the polyester range, polyethylene-terephthalate.

The thickness of the thermoplastic in the form of layer, film or film-laminate in the metal-plastic may be e.g. 12 to 100 μm, preferably 20 to 60 μm.

The metal foils and thermoplastics may be made into laminates e.g. by adhesive bonding, calandering or extrusion bonding. To join the layers one may employ adhesives and bonding agents as necessary, and the surfaces to be joined may be modified by plasma, corona or flame pre-treatment.

Examples of metal-plastic laminates are those having a first layer e.g. a film or a film-laminate of the above mentioned thermoplastics, a second layer in the form of a metal foil and, on the free side of the metal foil, a third layer viz., a sealing layer of a polyolefin such as polyethylene or polypropylene or PVC.

Further useable metal-plastic laminates may exhibit a first layer e.g. a film or film-laminate of the above mentioned thermoplastics, a second layer in the form of a metal foil, and a third layer, for example a film or film-laminate or an extruded layer out of one of the above mentioned thermoplastics. Further layers such as sealing layers may be provided.

The metal-plastic laminates may feature a sealing layer in the form of a sealable film or a sealable mating at least on one of the outer lying sides, or on both outer sides. The sealing layer is of necessity the outermost layer in the laminate. In particular the sealing layer may be on one outer side of the laminate, and should be directed towards the contents or shoulder side of the shaped packaging, this in order to enable the lidding foil or the like to be sealed into place.

Typical examples of metal-plastic laminates used in practice are:

oPA 25/Al 45 /PVC 60 oPA 25/Al 45 /oPA 25

Al 120/PP 50 oPA 25/Al 60/PE 50 and oPA 25/Al 60/PP 60 where oPa stands for oriented polyamide, PVC for polyvinylchloride, PE for polyethylene, PP for polypropylene and Al for aluminum and the numbers the thickness of the layer or foil in μm.

Seen in FIG. 1 is a device comprising a die 1, a retaining tool 5 and a stamp 6. In the present case the stamp features a support (nor shown) and mounted thereon a number of stamping tools 6. The number of stamping tools corresponds to the number of openings in the die 1. The stamp or the stamping tools 6 penetrate the opening 7 in the retaining tool 5. A metal-plastic laminate (not shown) is placed between the die 1 and the retaining tool 5. By applying force, the retaining tool 5 is pressed against the die 1, as a result of which the metal-plastic laminate is held securely at all places of contact between the die 1 and the retaining tool 5 and essentially unable to be stretched. The stamping tools 6 are lowered under the application of force and enter the opening 7 in the retaining tool, press against the metal-plastic laminate (not shown) and, while deforming the metal-plastic laminate, pass through the die openings 8 in the die, until the desired degree of deformation of the metal-plastic laminate has been achieved.

The metal-plastic laminate is held both in the edge region and in the shoulder region 13 between the retaining tool 5 and the die 1, essentially unable to be stretched, and the deformation of the laminate effected solely within the material covering the die opening 8.

Figure 2:
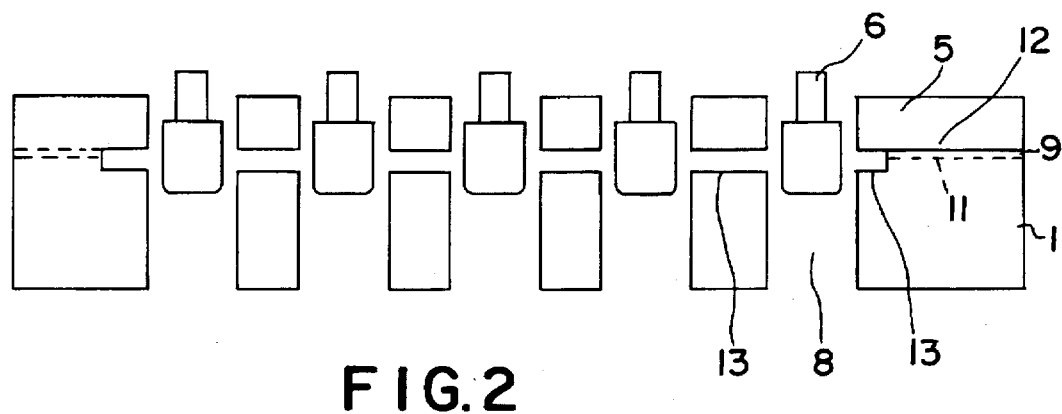

The device according to the invention is shown in FIGS. 2 and 3 again with the die 1, the retaining tool 5 and the stamp (stamping tools) 6. The retaining tool 5 features an edge region 12. A roughness pattern 9 is provided in the edge region 11 of the die. The whole shoulder region 13 i.e. the region of the die 1 that is located within the die region 11 and forms the shoulders that surround the die openings, is lower than the edge region 11. Lowering the shoulder region 13 of the die 1 may be achieved by a chip-forming process such as milling or by spark erosion etc. The die 1 may also be in two parts such that the edge region 11 and the shoulder region 13 can be moved and adjusted with respect to each other and, on reaching the desired difference in height, may be secured in place with respect to each other. The die 1 may also be a casting that already exhibits the lower height in the shoulder region 13. Likewise, it is also conceivable for the retaining tool not to exhibit a flat surface facing the die 1, but an edge region 12 and a shoulder region that is lower than the edge region 12. The metal-plastic laminate is secured, in a non-stretchable manner clamped between the retaining tool 5 and the die 1, especially in the edge region 11 of the die that is covered by the edge region 12 of the retaining tool. In the shoulder region 13, both along the edge region and the shoulders between the die openings, the metal-plastic laminate may flow and be deformed by stretching to a degree determined by the extent that the stamp 6 is lowered into the die openings 8.

Figure 3:
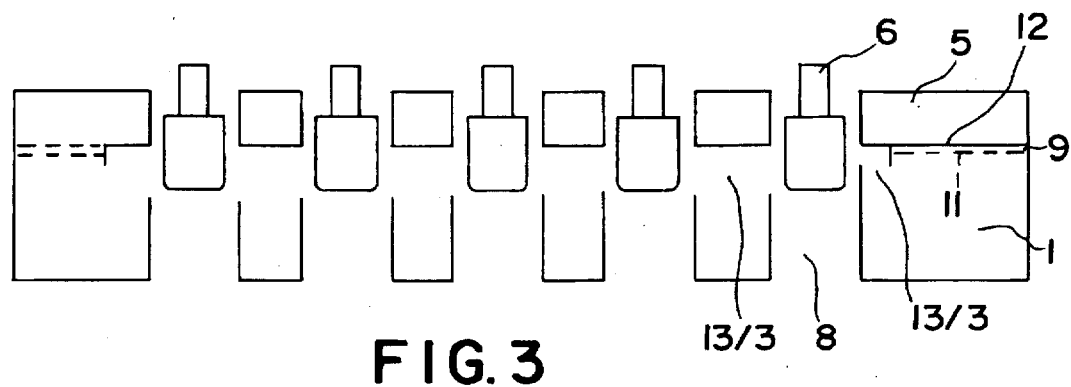

Shown in FIG. 3 is the additional advantage of a low friction layer 3 e.g. polytetrafluorethylene, polyoxymethylene; polyolefins or polyethylene-terephthalate etc. The layer usefully extends over the whole of the shoulder region 13 of the die 1. In specific cases it is possible to employ a layer that extends over only part of the shoulder region 13.

Figure 4:
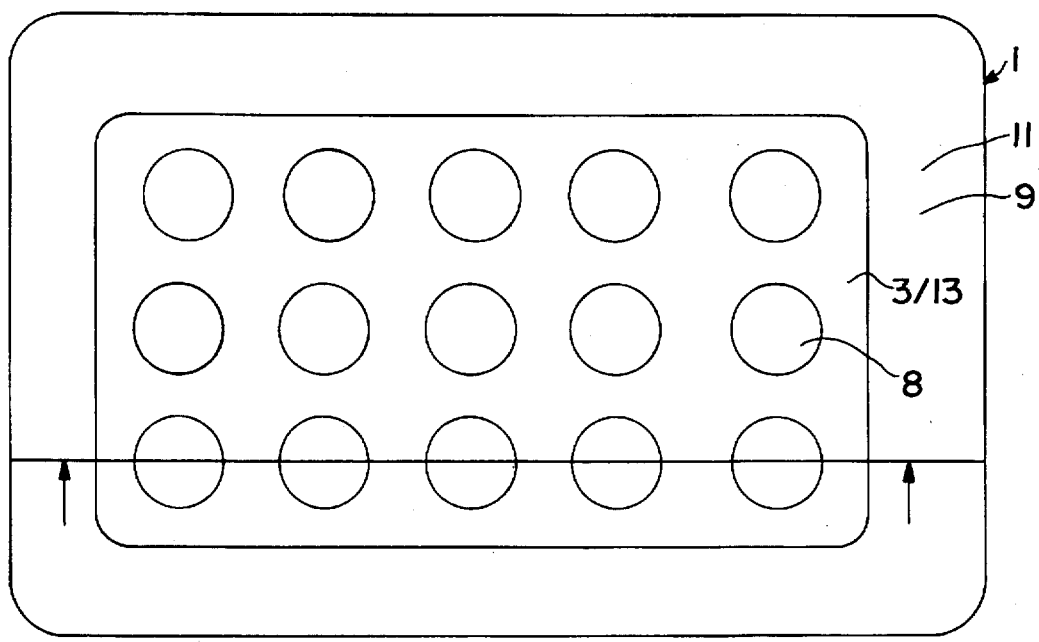

FIG. 4, a plan view of a die 1, shows the edge region 11 shaded dark and the shoulder region 13 lightly shaded. The edge region 11 may feature a roughness pattern 9. The shoulder region 13 lies 0.01 to 10 mm lower than the edge region 11. In an advantageous version the lightly shaded region i.e. the shoulder region 13, is partly and especially fully covered with the described low friction deposit or layer 3. The die openings 8 are shown by way of example in a regular array in the shoulder region 13. As a rule this concerns holes i.e. openings or recesses that are round in cross-section or openings that are oval in cross-section. Also openings that are polygonal in cross-section e.g. rectangular, square or six sided may be created without any difficulty.

Figure 5:
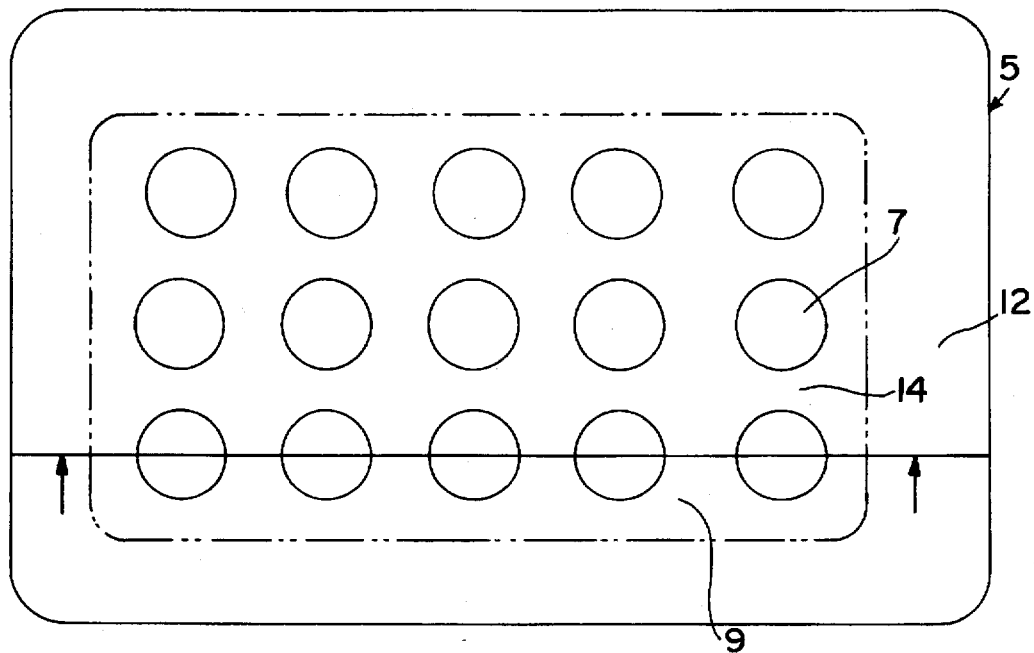

A retaining tool 5 is shown in plan view in FIG. 5. The surface 14 of the retaining tool 5 which faces the die and comes to rest on the laminate during manufacture may be flat. In the production stage the laminate is securely clamped across the areas of contact with the edge region 12 of the retaining tool 5 and the edge region 11 of the die 1, and viz., such that the laminate can not stretch or flow there. Instead of a flat surface the retaining tool 5 may also feature an edge region 12 and lower region within the edge region, or the retaining tool 5 may essentially comprise only of the edge region i.e. a ring.

A roughness pattern may be provided over part or the whole of the surface in the edge region 12 of the retaining tool 5. The edge region of the retaining tool 5 is usefully positioned and essentially of the same dimension as the edge region 11 of the die 1.

The retaining tool 5 exhibits a plurality of openings 7 or recesses, in the present case openings. The openings 7 are penetrated by the stamp or stamping tools and, accordingly, the holes are arranged in the same manner and at least approximately the same size as the openings 8 in the die 1.

In the present illustrated example a relatively small die is shown. It is also possible to design dies according to the present invention the shoulder region of which is subdivided by transverse and/or longitudinal struts. The metal-plastic laminate is held, clamped securely in place, in the region of these struts. This enables a plurality of shaped packaging to be produced e.g. with one die and one stroke of the stamp. After the shaping process, the shaped packs that are produced simultaneously may be separated e.g. at dividing lines along the struts.

The present invention also relates to a process for manufacturing cold-formed packaging forms out era metal-plastic laminate by deformation of the same and in particular by drawing the laminate with the aid of a die and a retaining tool that hold the laminate securely and a stamp that deforms the laminate, where the die and the retaining tool feature facing edge regions and the laminate is held, clamped and non-stretchable, between the edge of the die and the edge of the retaining tool, and the stamp draws the laminate over the shoulders of the die into the die openings which are situated within a shoulder region in the die, the surface of the shoulder region lying 0.01 to 10 mm lower than the edge region of the die, and the laminate is drawn and/or stretched in a sliding manner over the surface of the shoulder region.

Cold-forming in the present case includes deformation at temperatures e.g. of 10° to 35° C. and preferably 20° to 30° C.

The device according to the invention may be employed for manufacturing cold formed shaped packaging forms such as blister packs for pharmaceuticals, foodstuffs and luxury consumables, technical articles, for base and lid parts of semi-rigid and rigid packaging, for wraps etc. out of metal-plastic laminates. A drawing ratio, i.e. a ratio of diameter to the height of the recess formed, of e.g. 2 to 3 may be achieved. The diameter of the recess, if not round in cross-section, is to be understood as the smallest diameter i.e. in the case of non-circular cross-sections, such as a convex cross-section e.g. elliptical, oval, polygonal, rectangular, trapezium shaped, rhomboid etc.

The largest diameter of individual recesses may be e.g. 1 to 500 mm; the height of a recess from 1 to 100 mm The laminates that are processed into shaped forms of packaging such as blister packs and in particular base parts of blister packs remain pore-free even at high drawing ratios, and the reject rate related to deformation i.e. shaping is substantially reduced.

EXAMPLE

1. A metal-plastic laminate comprising a 25 μm thick oriented film of polyethylene, a 45 μm thick aluminum foil and a 60 μm thick PVC layer was subjected to deformation trials in a device according to the invention featuring a die, a retaining tool and a stamp. In the finished product the PVC layer represents the inside of the packaging. The die produces a packaging form exhibiting 10 blisters i.e. a blister base with 10 recesses, the diameter of each recess being 13.5 mm. Accordingly, the die exhibits 10 openings, while the retaining tool likewise exhibits 10 openings at the same sites. The stamp features 10 stamping tools which are able to penetrate the openings in the retaining tool and effect the deformation of the laminate as dictated by the openings in the die. The diameter of each stamping tool is 12.8 mm The die features a 20 mm broad edge region with the shoulder region lying within the edge region. The edge region of the die is provided with a roughness pattern in the form of grooving. The surface of the shoulder region is 0.3 mm lower than the edge region. This was achieved by milling the die i.e. subjecting it to a chip-forming process. The laminate is introduced between the die and the retaining tool and the retaining tool lowered against the die, as a result of which the laminate is held securely such that the laminate material pressed between the retaining tool and the die is not able to flow. The stamp is then lowered, deforming the laminate until its originally flat surface in the region of the die opening is 3.7 mm lower. The process is carried out cold i.e. without any heat being applied. The stamp is lowered and then raised, the pressure on the retaining tool removed; a base part for a blister pack may then be removed from the device. The measured pore-free permanent depth of deformation mounted to 3.1 mm.

2. The trial described under example 1 was repeated. In this case, however, the shoulder region of the die employed is 0.15 mm lower than the surface of the edge region. The whole of the shoulder region was milled to a depth or 8.15 mm below the edge region and an 8 mm thick layer of polytetrafluorethylene (Teflon) inserted in the whole shoulder region. The shoulder region is therefore 0.15 mm lower than the edge region of the die. The diameter of the die opening was again 13.5 mm, the diameter of the stamp 12.8 mm. A laminate—same as in the first example—is introduced into the device and again processed into a base part for a blister pack. The stamp is lowered 3.8 mm and again withdrawn. The measured pore-free, permanent depth of deformation amounted to 3.2 mm.

3. A comparative trial was carried out with a die exhibiting no edge region and no shoulder region, but only with 13.5 mm diameter die openings in the flat die surface. The laminate between the retaining tool and the die is therefore not only clamped in the edge region, but also in the shoulder region, i.e. over the whole surface outside the die opening. A laminate as described in the first example is processed to a base for blister packs under the same conditions of die opening stamp diameter (12.8 mm) and depth of penetration (3.4 mm) of the stamp into the die opening. The measured pore-free, permanent depth of deformation amounted to 3.0 mm.

4. In a further trial a series of base parts for blister packs was manufacture. The stamp was lowered by 4.4 mm. The forming conditions were chosen such that using a state-of-the-art die as described in example 3 a reject rate of 100% was obtained with respect to pore-free, permanent deformation. Using the same test equipment and the same trial conditions—with the exception, however, that a die according to the invention as described in example 1 was employed—the reject rate was reduced to 88%. Using the same test equipment and the same test conditions—with the exception that a die according to the invention as described in example 2 was employed—the reject rate was reduced to 58%.

We claim:

1. Device for manufacturing cold-formed shaped forms of packaging out of a metal-plastic laminate having a metal layer of 8 to 150 microns thick, which comprises a device containing a die with a plurality of spaced die openings, and an edge region, a stamp movable into the die openings for deforming the laminate into said die openings, and a retainer tool as a clamping facility that holds the laminate securely between the die and the clamping facility, wherein the die and the retaining tool feature facing edge regions for clamping the laminate and inside the edge region of the die a shoulder region that surrounds the die openings, said shoulder region having a surface thereof and said die edge region having a surface thereof, and the surface of the shoulder region lies 0.01 to 10 mm lower than the surface of the edge region of the die, wherein the laminate is at least one of drawn and stretched in a sliding manner over the surface of the shoulder region.

2. Device according to claim 1, wherein the surface of the shoulder region of the die lies 0.1 to 2.0 mm lower than the surface of the edge region of the die.

3. Device according to claim 1, wherein the die features up to 200 openings and the shoulder region of the die surrounds each opening.

4. Device according to claim 3, wherein the die openings have walls and the walls of the openings in the die are at an angle of 90° to the surface of the shoulder region.

5. Device according to claim 3, wherein the die openings have walls and the region between the walls of the die opening and the surface of the shoulder region is rounded and the rounding exhibits a radius of 0.1 to 10 mm.

6. Device according to claim 3, wherein the edge regions of the retaining tool and the edge regions of the die are 1 to 100 mm broad.

7. Device according to claim 3, wherein in the shoulder region the distances between the edge region of the die and the die openings and between the individual openings in the die are 1 to 50 mm.

8. Device according to claim 1, wherein at least one of the edge region of the retaining tool and the edge region of the die feature a roughness pattern over at least part thereof.

9. Device according to claim 1, wherein parts of the retaining tool face the shoulder region of the die, and wherein in the working position the edge region of the retaining tool and the edge region of the die lie together over the metal-plastic laminate, and the shoulder region of the die lies a distance from the facing parts of the retaining tool.

10. Device according to claim 1, wherein the shoulder regions of the die are at least covered by a surface of low friction.

11. Device according to claim 1, wherein the shoulder regions of the die are covered over at least with a surface layer including plastics selected from the group consisting of polytetrafluoroethylene, polyoxymethylene, polyethylene and polyethylene-terephthalate.

12. Device according to claim 1, wherein at least the surface of the stamp effecting deformation that comes into contact with the laminate is selected from the group consisting of polytetrafluoroethylene, polyoxymethylene, polyethylene and polyethylene-terephthlate.

13. Device according to claim 1, including recesses formed in the laminate by said stamp, wherein the recesses have a diameter of 1 to 500 mm and a height of 1 to 100 mm.

14. Device according to claim 1, wherein the diameter of the stamp is 3 to 35% smaller than the diameter of the die opening.

15. Device according to claim 1, wherein the thickness of the plastic is 12 to 100 microns.

16. Device according to claim 3, wherein the die has 8 to 40 die openings.

17. Device according to claim 1, for manufacturing cold-formed shaped forms of packaging out of a metal-plastic laminate.

18. Process for manufacturing cold-formed shaped forms of packaging out of a metal-plastic laminate having a metal layer of 8–150 microns thick, which comprises drawing the laminate using a die and retaining tool that hold the laminate in place and a stamp that deforms the laminate, wherein the die includes an edge region and a shoulder region both with surfaces thereof, said shoulder region being inside the edge of the die and surrounding a plurality of spaced die openings, and the die and the retaining tool feature facing edge regions, and holding the laminate, clamped and non-stretchable, between the edge of the die and the edge of the retaining tool, and drawing the laminate by the stamp over the shoulders of the die into said die openings, positioning the surface of the shoulder region 0.01 to 10 mm lower than the surface of the edge region of the die, and at least one of drawing and stretching the laminate in a sliding manner over the surface of the shoulder region.

19. Process for manufacturing cold-formed shaped forms of packaging according to claim 18 out of a metal-plastic laminate including the steps of drawing the laminate by means of a die and retaining tool that hold the laminate in place and a stamp that deforms the laminate, and deforming metal-plastic laminates of:

oPA 25/Al 45/PVC 60 or oPA 25/Al 45/PVC 25 or

Al 120/PP 50 or oPA 25/Al 60/PE 50 or oPA 25/Al 60/PP 60, oPA standing for oriented polyamide, PVC for polyvinylchloride, PE for polyethylene, PP for polypropylene and Al for aluminum and the numbers the thickness of the layer or foil in µm.

20. Process according to claim 18, including the step of drawing the laminate by the stamp with a ratio of diameter to the height of the recess formed being from 2 to 3.

* * * * *

UNITED STATES PATENT AND TRADEMARK OFFICE
CERTIFICATE OF CORRECTION

PATENT NO.  : 5,664,454
DATED       : September 9, 1997
INVENTOR(S) : HEINZ OSTER ET AL.

It is certified that error appears in the above-indentified patent and that said Letters Patent is hereby corrected as shown below:

On the title page: Item [75]

the order of the inventors is incorrect. The correct order of the inventors is as follows:

(1) Heinz Oster
(2) Patrik Zeiter
(3) Monique Roulin

Signed and Sealed this

Ninth Day of December, 1997

*Attest:*

BRUCE LEHMAN

*Attesting Officer*     *Commissioner of Patents and Trademarks*